United States Patent [19]

Ganot

[11] Patent Number: 5,166,680
[45] Date of Patent: Nov. 24, 1992

[54] PORTABLE PARKING METER DEVICE AND METHOD OF OPERATING SAME

[75] Inventor: Zvi Ganot, Omer, Israel

[73] Assignee: Ganis - Smart Park Systems Ltd., Israel

[21] Appl. No.: 531,158

[22] Filed: May 31, 1990

[30] Foreign Application Priority Data

Jun. 16, 1989 [IL] Israel ................................ 090641
Mar. 30, 1990 [IL] Israel ................................ 093962

[51] Int. Cl.5 .................................... B60Q 1/48
[52] U.S. Cl. ........................... 340/932.2; 235/384; 364/467; 368/90
[58] Field of Search .............. 340/932.2, 928, 901; 364/467; 235/378, 384; 368/90

[56] References Cited

U.S. PATENT DOCUMENTS

| | | | |
|---|---|---|---|
| 4,682,170 | 7/1987 | Kubota et al. | 340/932.2 |
| 4,717,815 | 1/1988 | Tomer | 364/467 |
| 4,730,285 | 3/1988 | Lie | 368/90 |
| 4,755,660 | 7/1988 | Nakano | 235/380 |
| 4,861,971 | 8/1989 | Chan | 364/467 |
| 4,876,540 | 10/1989 | Berthon et al. | 368/90 |
| 4,963,723 | 10/1990 | Masada | 364/467 |
| 4,982,070 | 1/1991 | Bezin et al. | 235/384 |

FOREIGN PATENT DOCUMENTS

| | | |
|---|---|---|
| 34570 | 2/1981 | European Pat. Off. . |
| 297531 | 6/1988 | European Pat. Off. . |
| 2523337 | 9/1983 | France .................. 364/467 |
| 2594985 | 11/1985 | France . |
| 2582123 | 5/1986 | France . |
| 2604276 | 9/1986 | France . |
| 69147 | 7/1983 | Israel . |
| 2158628 | 11/1985 | United Kingdom . |
| 2185137 | 7/1987 | United Kingdom ......... 368/90 |
| 2202068 | 9/1988 | United Kingdom ......... 368/90 |
| 8809022 | 11/1988 | World Int. Prop. O. ....... 368/90 |

Primary Examiner—Jin F. Ng
Assistant Examiner—Brent A. Swarthout
Attorney, Agent, or Firm—Lerner, David, Littenberg, Krumholz & Mentlik

[57] ABSTRACT

A portable parking meter device comprises, in combination, a portable registering device and an exchangeable card to be used in conjunction therewith, means provided in the registering device for transmitting to the card, in each parking, signals defining the tariff associated with the parking lot, the authority to which the parking fee is to be paid, and the exact duration of each parking, and means provided in said card for storing said signals.

3 Claims, 6 Drawing Sheets

PORTABLE PARKING METER DEVICE AND METHOD OF OPERATING SAME

BACKGROUND OF THE INVENTION

The present invention relates to a portable parking meter device and to a method of operating the same.

It is customary for local authorities and parking lot owners to charge fees for allowing drivers the use of parking spaces, in covered or open areas or along streets and in parking lots. The problem arises, when parking in different cities or in parking areas belonging to different parking authorities, of charging each driver for his use of the parking space and making sure that the charges will be credited to the proper authority or parking lot owner. This invention is essentially directed to solve this problem in connection with local authorities, e.g., municipalities, and reference will be made to them: however, private parking lot owners might also benefit from it. Fixed parking meters which are operated by coins do not solve the aforesaid problem and are limited in use by their very nature. Another solution consists in selling to the drivers parking cards, each of which can be used only for one parking, and which has means for marking thereon a day and the period of time in which the parking occurs. This solution, however, has many drawbacks. Each municipality must sell its own parking cards and those are not interchangeably usable for various municipalities, except in case of special agreements between them, which are in practice very limited. Furthermore, the exact parking time cannot be reckoned and a certain latitude must be afforded to the driver in marking the time in which the parking begins. The use of electronic parking cards, embodying a timer, has been suggested, whereby the start and the end of each parking time can be registered exactly, but even in this case the use of each card is limited to a specific area within the compass of one local authority.

SUMMARY OF THE INVENTION

The present invention solves all the problems which have not been solved by the previously known methods and devices, and specifically provides a parking device which permits the driver to be debited for the exact parking time, and which can be used anywhere, independent of the local authority, within an area in which suitable arrangements have been made for the use of the parking device. Furthermore, the invention permits to establish differentiated tariffs for different parking locations, even within the area pertaining to a single local authority, thus affording a much more rational management of the parking spaces.

The invention also provides a method for operating the aforesaid parking device, which permits the exact allocation of the parking fees between the various authorities.

The general purpose of the invention, therefore, is to permit a driver who parks a car to be debited for the said parking time, to establish differentiated tariffs for different parking locations, and to allocate the parking fees between the various authorities according to the areas in which the actual parking has occurred.

It is another purpose of the invention to permit operation of a parking device with a minimum power consumption, so that the batteries which energize the parking device may have the maximum useful life.

It is a further purpose of this invention to provide means whereby the parking device user may fully exploit the parking time which he has purchased.

It is still a further purpose of this invention to provide means for preventing interference of the user with the proper operation of the device and assuring that the actual parking time is properly paid for.

It is still a further purpose of this invention to provide means whereby the cards, which form a part of the parking device, instead of being exchangeable, may be disposable, and yet the parking fees may be properly allotted among the various authorities.

Other purposes of the invention will appear as the description proceeds.

The portable parking meter device according to the invention is characterized in that it comprises, in combination, a portable registering device and an exchangeable card to be used in conjunction therewith, means provided in the registering device for transmitting to the card, in each parking, signals defining the tariff associated with the parking lot, the authority to which the parking fee is to be paid, and the exact duration of each parking and means provided in said card for storing said signals. Said means provided in said card are such that the information embodied in said signals may not be erased, or it may be erased only by authorized personnel, using erasing devices that are not available to the driver. Preferred ways and means to accomplish this will be described hereinafter. Preferably means are provided in the registering device for indicating when the same is in operation and showing the maximum parking time, the tariff and authority and other pertinent information, as hereinafter specified, whereby to permit parking lot attendants or local authority officials to check that the parking is being carried out in a proper manner and the corresponding parking fee is registered.

The data registered on the parking card can be read by suitable reading devices, operated by the central authorities or by any suitable organization upon which this task is conferred, whereby to allocate the parking fees according to the locations in which the parkings have occurred and the duration of said parkings to the several authorities. Each parking card will accommodate a given accumulated parking time, and when the said time has been exhausted and the parking card is, so to speak, full, the full or exhausted parking card will be surrendered by the driver to the central authority or organization charged with allocating the parking fees—hereinafter briefly designated collectively as the "allocating authority"—or to a branch thereof, and a fresh card will be received in its stead.

According to one aspect of the invention, two power levels are provided in the device, and the higher power level is employed only when the microcomputer component of the device is required to effect a data elaboration operation or to execute commands which require such higher power level. In the remaining time of which the device is in use, power is maintained at a low or "power down" level. When the device is not in operation, of course, the power is cut off entirely.

According to another aspect of the invention, means are provided for permitting the parking to continue even after the time period which is registered on the card as "time stored", and which has been paid for when purchasing the card, has been exhausted, and to apply the excess time to a fresh parking card which will be later used in conjunction with the same device.

According to a further aspect of the invention means are provided to enable elaborating the data registered on the card only at the beginning and at the end of the parking, all other activity being carried out in the registering device with which the card is used.

According to a further aspect of the invention, means are provided for permitting collecting and registering the data relative to the parking fees allocation from outside the car, by means of a suitable receiver, and using the data so collected to calculate the percentages of the overall fees paid to be allotted to the various authorities.

It has been said that means are provided in the registering device for defining the tariff associated with the parking lot and the authority to which the parking fee is to be paid. These two variables may be independently introduced in the device and marked thereby, or each local authority may be assigned different code numbers corresponding to the various tariffs which the authority sets for different parking spaces, in which case a single code designation, e.g., a number, will indicate at the same time the tariff and the local authority. Using two different code designations or numbers permits of course of a greater flexibility, inasmuch as it permits the local authority to change at will the boundary of various tariff zones and various tariffs changing according to the time of the day, it being only required that the appropriate code number be marked in each parking zone. However, this involves a slight complication of the device and for economical reasons it may be desirable to dispense with it.

The invention in another aspect thereof, also provides a method of operating the movable parking meter device, comprising providing parking cards adapted for registration thereon of the parking tariff and location and parking times, distributing same, recovering same when full or exhausted, and reading the same to return in the appropriate distribution of the parking fees.

Other features of the device and method according to the invention will be described hereinafter. The invention will be better understood from a description of preferred embodiments, with reference to the attached drawings, wherein:

DESCRIPTION OF THE PREFERRED EMBODIMENTS

Figure 1:
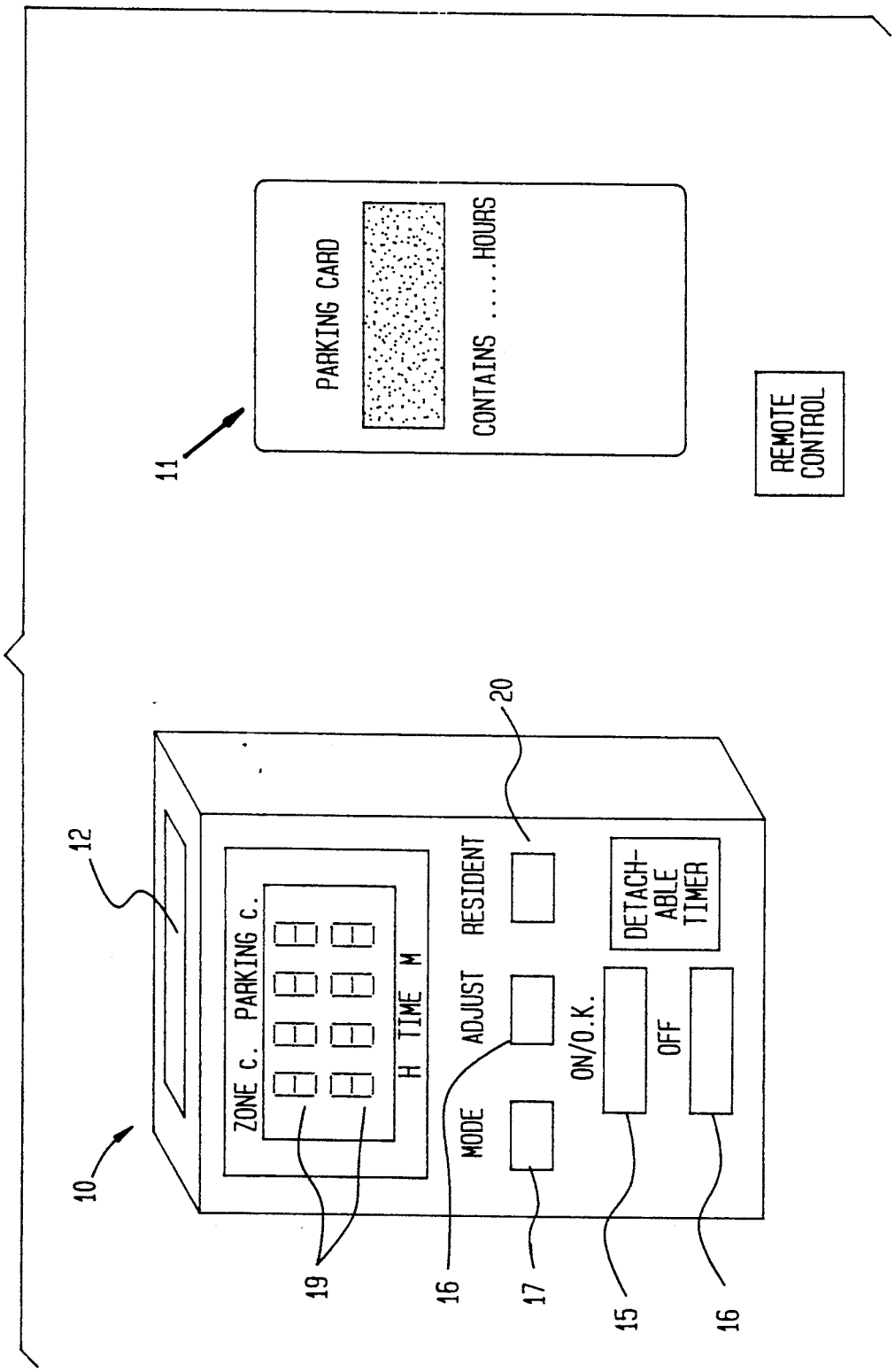
FIG. 1 is a schematic illustration of a device according to an embodiment of the invention, seen in essentially vertical perspective view.

The parking device according to an embodiment of the invention, as illustrated in FIG. 1, comprises a portable registering device 10 and a parking card 11. In the embodiment shown, the card 11 is introduced into a slot of the registering device 12; however it could be introduced in other ways, e.g. into a seat closed by a cover which protects both the card and the device from dust and contamination. Since the "time rate" (TR) is associated with each parking location and optionally to each period of the day in which the parking takes place, the number of parking hours shown on the parking card, hereinafter called "time stored" (TS), will correspond to a standard TR. Said standard TR will usually be 1, but need not be necessarily so.

The registration of the information may occur in various ways. The most conventional way is use of a magnetic card, on which information is stored in ways that are well known to persons skilled in the art and are currently applied in magnetic cards, and therefore need not be described. Alternatively, the information may be registered by means of laser beams, by using, e.g., the technique which is employed in compact discs and in other laser techniques, and which is also well known to persons skilled in the art. A third registering method is the computerized RAM system using a "smart card" or a "chip card" equipped with memory and means to communicate with the registering device.

The information registered with each parking, in the embodiment illustrated, comprises first of all a code number which indicates the local authority to which the parking fee is to be paid and another code number which indicates the tariff and the time limit associated with that particular parking space. But if provision is made for differentiated parking fees in various parts of the area pertaining to the same local authority, then more than one code number will be associated with each local authority and each code number will determine both the authority and the tariff to be applied to each particular parking space.

Figure 2:
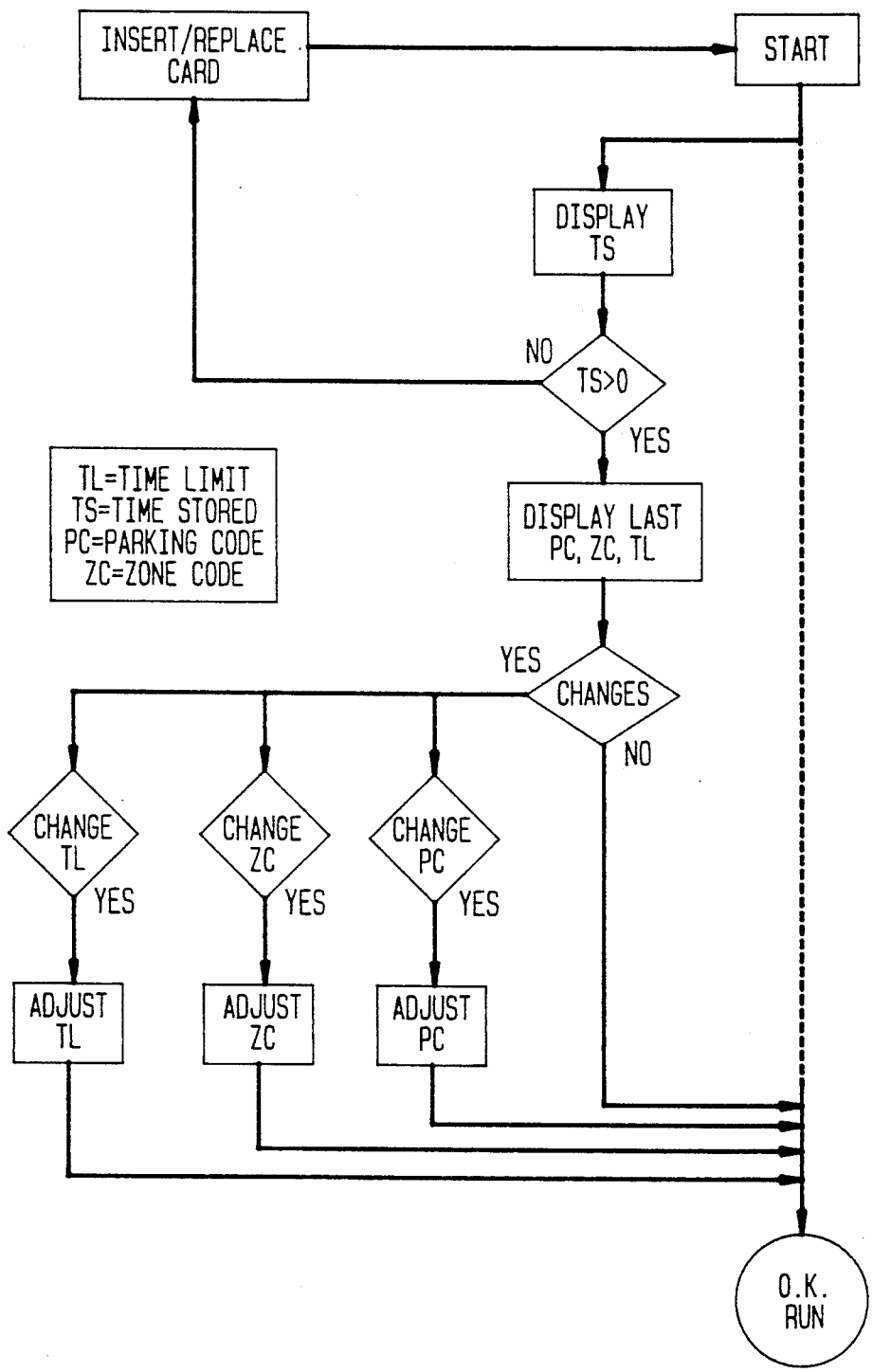
FIG. 2 is a block diagram illustrating the starting process of a device according to an embodiment of the invention.

To begin operation of the parking meter (FIG. 2) the driver will first of all introduce the parking card into the registering device, if it has not been done before, and set the device into operation by pressing a starting key, which is the "ON" key indicated by 15 in FIG. 1. At this point, a light or other signal will preferably appear on the registering device to indicate that the same is in operation. At this moment the time screen 19 will show whatever information it is desired to show. Such information will usually comprise the number of parking hours which are stored in the card at the time, viz. the "time stored" TS, or another value in its stead, as explained e.g. in connection with the embodiment of FIG. 4. Then the device will preferably display from the memory the fixed (or last) zone code, parking code and maximum parking time allowed in that zone, viz. the "time limit" TL. If the displayed parking details remain unchanged, the driver must reconfirm this by again pressing the "ON" key and the device will run accordingly, displaying on all screens the codes, so that any parking attendant or local authority official may ascertain that the parking fee is being correctly registered. The time passed, hereinafter called "time parked" TP, may also be shown on the display, or may not be shown. Changes in parking details must be made before the reconfirmation. Pressing mode key 17 brings cursor to the desired digit. Adjust key 16 changes the code number of this particular digit. Alternatively the device will be equipped with a full keyboard, which will enable e.g. the driver to recall on the display the TS and the TL, when he so wishes, and to change easily said parking details.

The registering device will include a time indicator, e.g., a crystal such as is used in crystal watches. However, the time which is registered on the card, hereinafter called "time charged" TC will not be, or will not always be, the real TP, but will be multiplied by a coefficient—the "time rate" TR—which corresponds to the tariff chosen. In other words, the time charged for the parking will be proportional but not equal to the real time. Any change in the parking code changes the tariff TR and the maximum allowed parking TL time simultaneously. Nevertheless, it is possible to change the TL, especially by reducing it and adjusting it to the driver's parking time estimation.

Choosing the proper zone code (local municipality) is very important as it influences the parking fees allocation among the participating parking authorities. After adjusting parking codes and other details, the "ON" key should again be pressed to reconfirm the codes and start operation of the meter.

Pressing residence key 20 gives zone residents a special parking fee. Key 20 should be pressed before reconfirmation. The device will store in its memory that this particular zone should be charged with the resident's fee, in all future parking. At this point the timer that is incorporated in the registering device will begin counting the parking time forward from zero to the maximum parking time selected, and can be shown on the screen indicated by 19. A buzzer will sound every few minutes to remind the driver to stop the parking device in the event of an early return.

If the driver desires to stop the parking and to leave the card inside the registering device, he will deactivate the device by pressing "OFF" key 18. Otherwise, the parking will stop when the chosen parking time has elapsed and the timer has reached the time limit, or when the card is removed. At this point, desirably, the registering device will sound an alarm, or will activate a visual warning signal or stop the displays, and the parking lot attendant or authorized official will be able to see that the device is no longer operating, viz., that the allotted parking time has been exceeded. If the maximum parking time is not entirely consumed, the registering device will register on the card the actual parking time, possibly rounded off to a certain fixed time, e.g., a minute or number of minutes.

Figure 3:
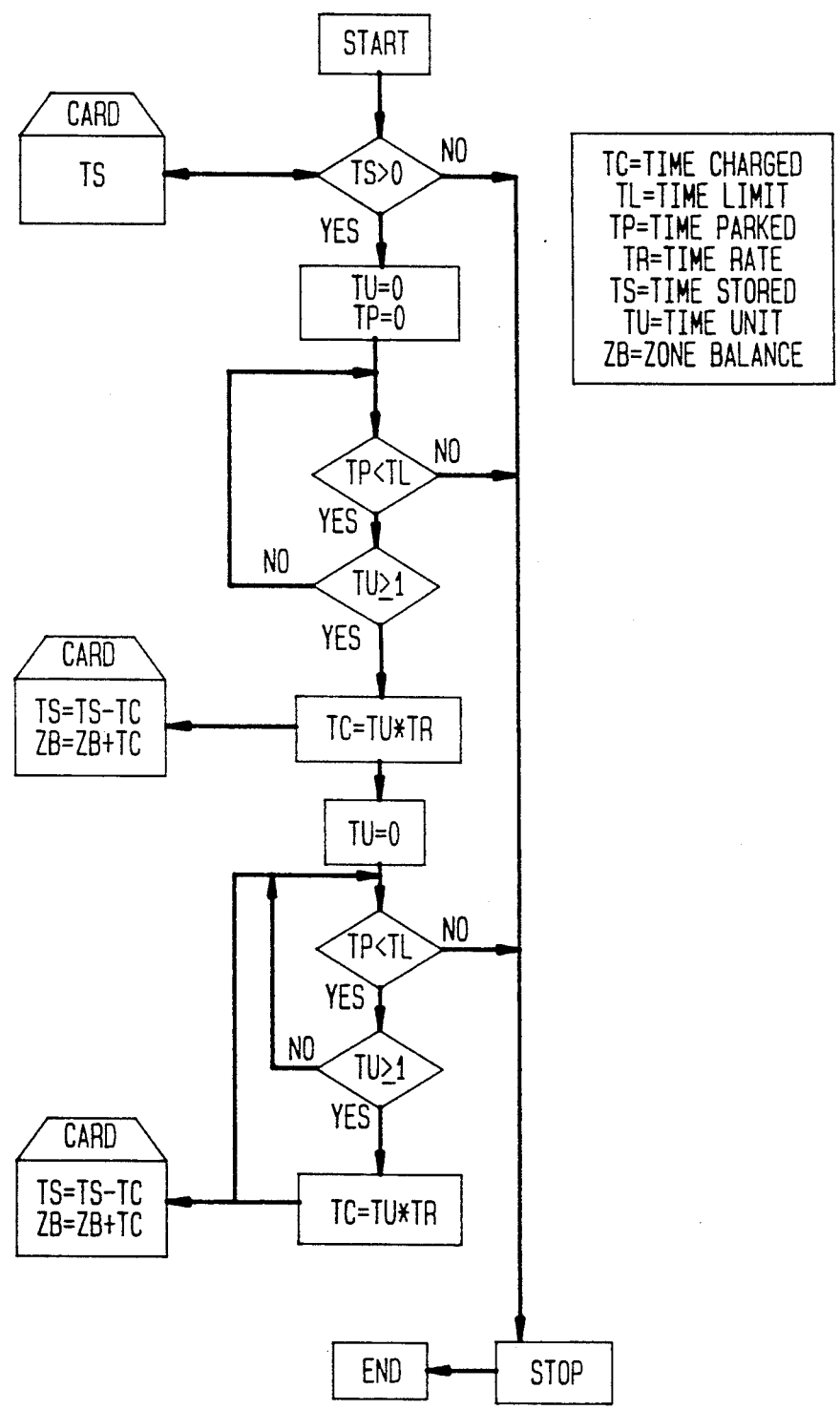
FIG. 3 is a block diagram illustrating the phases of the operation of a device according to an embodiment of the invention.

The operation of the device according to the embodiment so far described is better illustrated by the flow chart of FIG. 3. It is assumed that at the beginning TS is greater than zero, otherwise the use of card will not be allowed. At the starting point TU and TP are both zeroed and the device begins to count up according to the actual time. When the time which has passed equals or exceeds a predetermined time unit TU, which may be one or more seconds, the device multiplies said TU by the applicable time rate TR and calculates thus a time charged TC, which is registered in the registering device. TC is then deducted from the time stored to produce an updated TS and is summed to the registered credit referring to the particular parking zone in which the parking takes place, viz. the "zone balance" ZB to produce an updated zone balance ZB. The said operations are repeated until the device is stopped, either because the time limit TL has been exceeded or because the user has actuated the OFF key.

According to a preferred embodiment of the device, the same may continue to operate even after the maximum parking time TL has been consumed. In this case, however, a higher time rate TR will apply as a penalty, or possibly, a number of different TRs will apply to successive periods of time. However parking will not generally be allowed beyond a maximum TL; and if this is exceeded, the parking meter will signal this fact in a suitable way, e.g. by an optical and/or acoustic "illegal parking" signal or by shutting off the display.

In the embodiment hereinbefore described, the parking meter will stop operating, and will signal this in any suitable way, when the time charged TC equals the time stored TS. However in another preferred embodiment of the invention, the parking meter may continue to operate and will then register the amount of time charged which exceeds the time stored, viz. TC-TS, as "time due" TD. This will remain in the parking meter's memory and when the next parking card is introduced therein, the operation described in the flow chart of FIG. 3 will start after the TD has been subtracted from the TS and added to the ZB which is to be credited for the parking which has produced the said TD.

According to another embodiment of the invention, the parking meter will check all the data that are relevant to the maximum parking time TL and to the time rate TR against the data that are registered on the card. If there is a difference, the data registered on the card will be introduced into the memory of the registering device and will be used from then on. In this way all changes in tariffs or other conditions of the various parking zones are automatically registered by the parking meter, since they will be embodied in the parking cards issued after said changes have occurred.

It is possible to include in the registering device a watch and a calendar and to register all details of the parkings in the memory of the registering device, under the appropriate time periods. This may permit verification of parking violations with which the driver may have been erroneously charged or, at any rate, to provide a record that may be useful for a number of other reasons. Other instructions may thus be given to the meter, including changes in tariffs and other data, depending on the time of the day.

Figure 4:
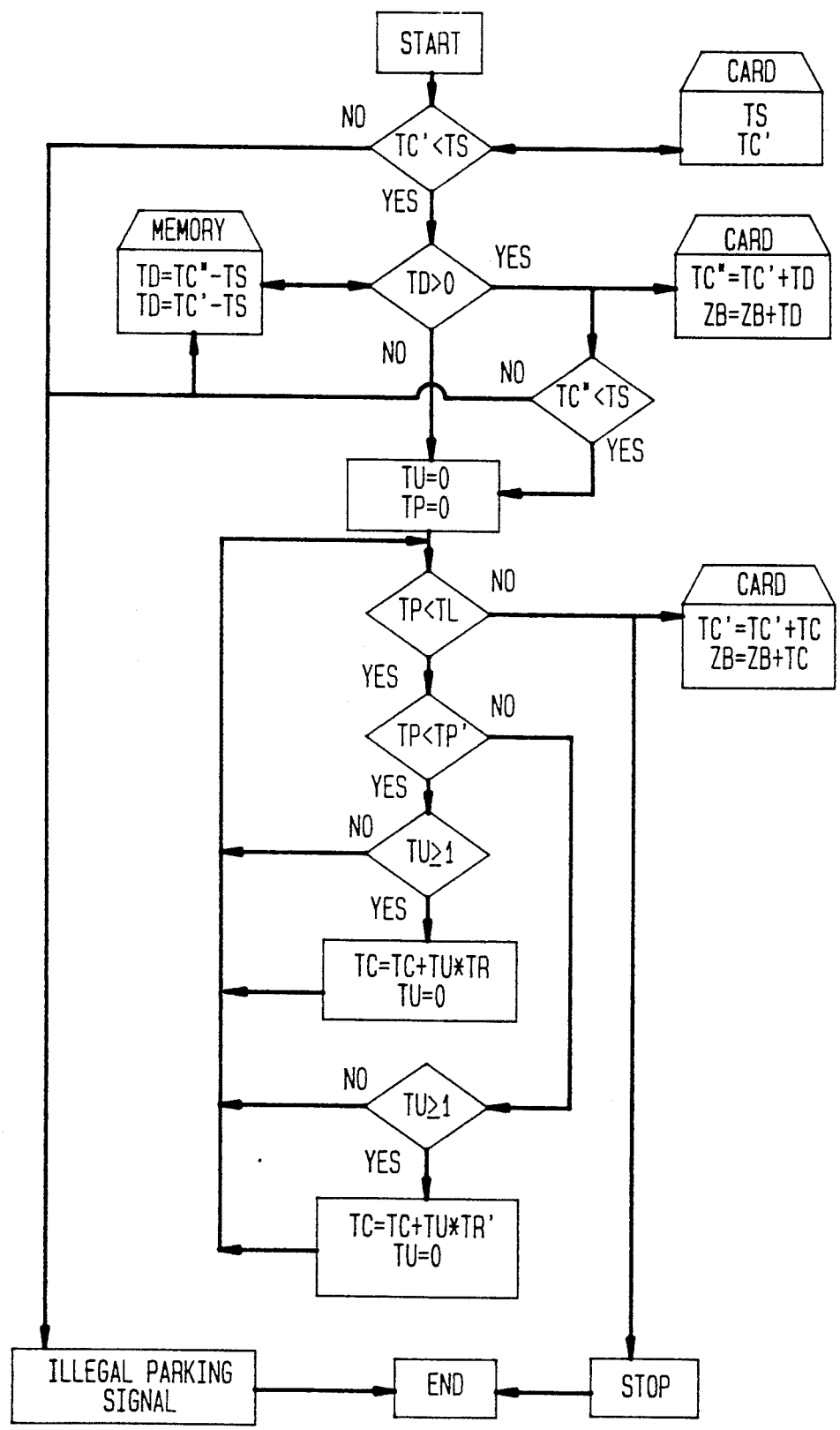
FIG. 4 is a block diagram illustrating the phases of the operation of a device according to another embodiment of the invention.

According to another preferred embodiment of the invention, the flow chart of which is illustrated schematically in FIG. 4, the registering device is provided with a buffer memory for storing temporarily all the data connected with the operation of the device, until the end of the parking is reached, at which time the pertinent data will be transferred to the parking card. The parking card has stored therein, besides the accumulated time charged TC' and the time stored TS, a number of time rates TR and time limits TL, which are grouped according to parking zones. More than one TR and/or TL may be stored in the card for each parking zone, for the following reasons. Firstly, TR and/or TL may change according to the time at which the parking starts: for instance, a lower TR may be attributed to night parking. Further, it may be desirable to vary the TR as the time parked TP increases. E.g., TR may have a certain value for TP up to 1 hour, a greater value for TP between 1 and 2 hours, and so on. For each zone there will generally be set a maximum allowable time, the time limit TL above which parking is not allowed even with increased TR.

In this embodiment, the time debt TD may be stored in the memory of the registering device. When this is started by depressing the ON key, the registering device will read from the card the accumulated TC' and will add to it the TD, if any, and the resulting value will be stored in the card in place of the original TC' to produce an "adjusted" TC' indicated hereinafter as TC". If TC" is equal to or greater than TS, the registering device will cease operating and will signal, in any suitable way, that the card is empty, even though the original TS was greater than TC'. While adding TD to TC', the registering device will at the same time update the applicable ZB due to the zone to which the TD refers.

Before starting the registering device by reconfirming the setting, the driver will have entered the parking zone code, as in the previously described embodiment. The registering device will read from the card all the data relative to that code and store them in the buffer memory. Among those data will be the initial TR and the parking times TP at which the TR changes. In the embodiment described herein it will be assumed that there is only one such change, viz., there are only two possible values of TR, and the passage from one TR to the next, which will be indicated with TR', will occur when TP reaches a value which will be indicated by TP'. Apart from the change in the value of TR which may occur more than once, although in the embodiment described it is assumed to occur only once, the device will operate substantially as that of the previous embodiment and as illustrated in the flow diagrams of FIGS. 2 and 3, except that no feedback to the card occurs until the parking time limit TL has been reached or the OFF key is depressed. When said event happens, the following operations occur automatically. If the TC is smaller than the TS, it is entered in the card. If it is greater, the registering device will enter in its memory the difference TC'−TS=TD and will invalidate the card, e.g., by making TS=0 in the same. The registering device will be provided with an additional mode in which it will read from the card the TS and the TC' and show on the display the adjusted TS, equal to TS−TC'−TD. Since the card will normally be kept inside the registering device until it is exhausted, the user may know at any moment how much parking time remains at his disposal in the card. Otherwise he will ascertain it at the beginning of the parking.

In this embodiment, therefore, the registering device's operation will not stop when the actual time stored is exhausted, but may continue, the negative difference TD being stored therein and subtracted automatically from the next parking card. A maximum allowable value of TD may be stored in the registering device's memory, and if it is exceeded, the device will signal in any suitable way that the parking has become illegal.

If the card is removed from the registering device while operating, the TC of the present parking will be stored in the buffer memory and marked as TD, and the registering device will signal an illegal parking or will stop operating. After the card has been returned and the registering device has been restarted, it will behave as described hereinbefore.

Figure 5:
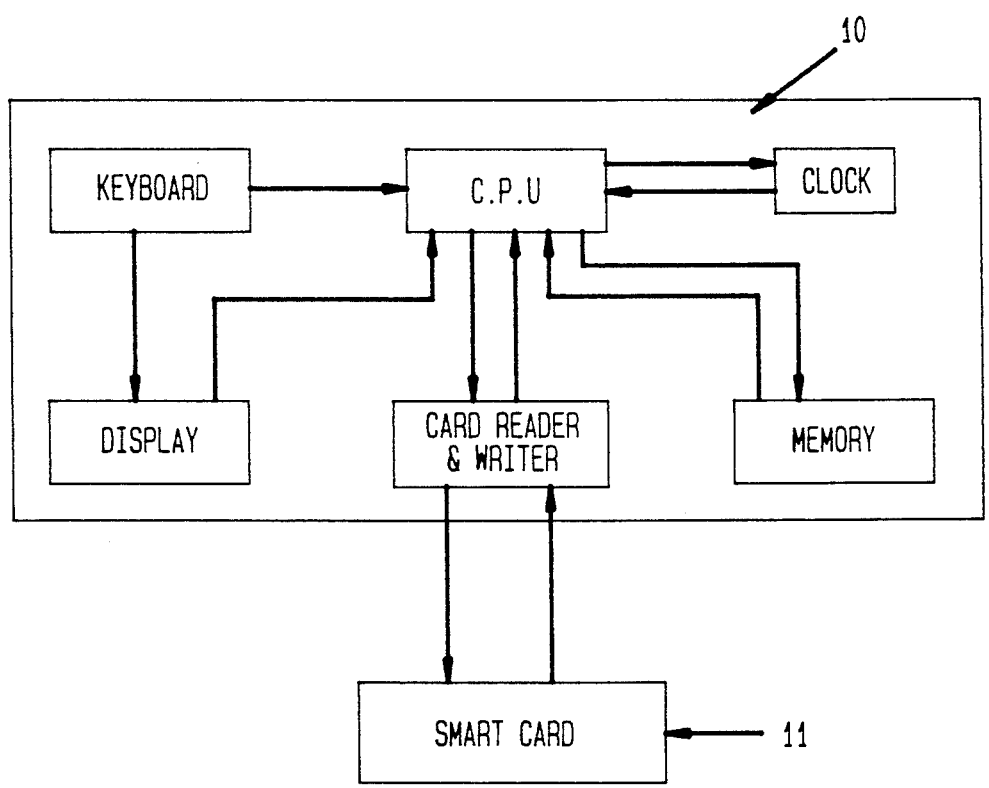
FIG. 5 is a block diagram schematically illustrating the structure of a device according to an embodiment of the invention.

FIG. 5 is a block diagram illustrating the structure of a registering device according to an embodiment of the invention. The registering device 10 is powered by batteries, not indicated, and essentially comprises a CPU, a keyboard, a clock, a display, a card reader and writer and a memory. It may of course comprise additional components.

The driver gives instructions to the CPU and directly to the display by means of the keyboard. The display may also receive data from the memory for the purpose of rendering them visible. The CPU controls the clock and receives impulses therefrom, and further receives data from the smart card and from the memory and transmits data to it. The smart card 11 receives data from the memory and transmits to it the required data. The aforesaid general schematic structure is adapted to a plurality of embodiments of the invention and can be made to perform according to a variety of operative flow diagrams, by suitable adaptation and programming, which are well within the capabilities of persons skilled in the art.

Figure 6:
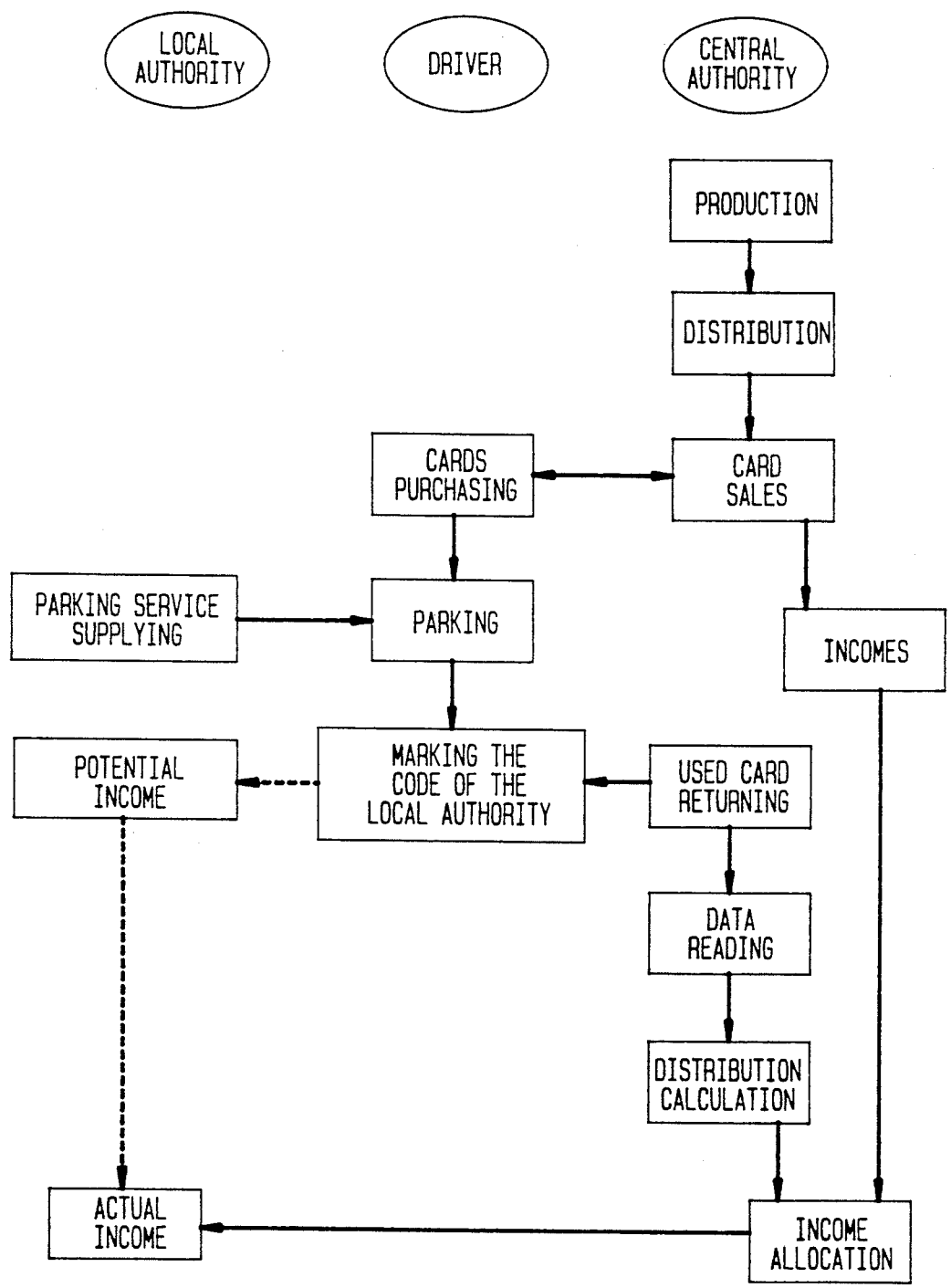
FIG. 6 is a schematic illustration of an operational network based on the use of devices according to the invention.

FIG. 6 illustrates how the use of the parking meter is administered. A central authority produces and distributes the parking cards. The cards are purchased by the drivers and are used for parking, in connection with the parking service which is supplied by the competent authorities. By marking the zone code of the local authority during parking, the driver assigns to it the income which should accrue to it, the "potential income". When the card is exhausted, it is returned, the data registered on it are read, suitable calculations are made therefrom, and the income due to each authority is calculated and is finally allocated.

According to a preferred aspect of the invention, a central authority, which may operate on a state-wide basis, will produce the parking meter devices and the parking cards and provide for their distribution. Parking cards will be offered to the drivers at a certain price, which will reflect the amount of parking time stored on the card, but this price will be paid only for a substitute (refill) card, which will be obtained by returning the previous card. The price of the first card should naturally be higher to insure that the exhausted card is returned. The driver will use the card, and when it is exhausted will exchange it for a fresh one. The exhausted card will be read by a suitable reading device and parking times marked thereon will be divided among the various authorities by suitable organizational arrangements, to find the proportions in which the income from the sales of the parking cards will be shared by the participating parking authorities, taking into account that a number of cards are lost or destroyed, or otherwise not returned.

For economical reasons, it may be desirable to reuse the alreadyexhausted parking cards, viz., to erase their content and redistribute them. Now, in this case, means must be provided to prevent the driver from erasing the information registered on the card and using it repeatedly. This can be achieved by registering on the card a code which is only known to the proper authorities and in the absence of which the card will not be operative and a signal will be transmitted to the local registering device, so that this will show that the parking operations are not being carried out, and optionally sound an alarm.

Alternatively, the parking card may be such that it can be used only once, or in other words the information may be registered in an unereaseable way.

Certain optional features may be provided in a device according to the invention. For instance, a second twin removable small timer can be used, which will be set up simultaneously while setting the park timer and can be taken by the driver. This timer will sound an alarm some minutes before the parking time expires. The device may be provided with a remote control that will permit to operate it or to renew its operation from a distance. The device may also be so arranged that the parking card may be removed from it, after the device is set in operation. In this case, a single card may be passed from driver to driver and may be used for different cars. In order to prevent counterfeiting of the parking cards, a suitable code may be provided thereon for authentication. The code may be sufficiently complex so that it will be known only to authorized officials. If a card is not provided with that code, the registering device will reject it or refuse to operate and show a suitable alarm signal. Furthermore, a personal code, e.g., a "password", can be included in the device, which can be changed at will by the user. Such a password may be useful, e.g., to avoid unauthorized use of the meter and to render it unattractive to steal the parking meter, as a stolen device cannot be utilized without knowledge of the password.

While some aspects of the invention and preferred embodiments have been illustrated, it will be obvious that the invention may be carried out in many other different ways, and with many modifications and adaptations within the compass of persons skilled in the art. For instance, the registering device and the exchangeable card may be united into a single unit or piece, and time parking and zone codes can be marked in the memory until they fully fill it, and the unit can be then replaced by a new unit, the remainder of the process remaining unchanged. In another instance, the exchangeable card may be an electronic chip or card which can be removed from the main body of the unit and replaced. Many additional possible solutions will be apparent to the skilled person.

I claim:

1. A parking meter device, comprising, in combination, a portable registering device and an exchangeable card to be used in connection therewith for a plurality of parkings and parking authorities, said card comprising means for storing and transmitting to said registering device data defining a parking time purchased with said card and not yet used, said registering device comprising means for selecting and registering therein, for each of said parkings, signals identifying a designated parking authority which is to be credited with a parking fee for a parking and a tariff associated with a parking lot, means for measuring an elapsed parking time, means for multiplying said elapsed parking time by said tariff to calculate a parking payment to be credited to said designated authority for said parking, means for transmitting to said card information defining said designated authority and said parking payment, said card comprising means for storing said information for future use, and further comprising apparatus for reading the information stored in the card and for determining from said information and for each of said parkings the designated authority and the parking payment to be credited to said authority.

2. A portable parking meter device, comprising, in combination, a portable registering device and an exchangeable card to be used in connection therewith, said card comprising means for storing and transmitting to said registering device data defining a parking time purchased with said card and not yet used, said registering device comprising means for selecting and registering therein, at each parking, signals identifying a parking authority which is to be credited with a parking fee and a tariff associated with a parking lot, means for measuring an elapsed parking time, means for multiplying said elapsed parking time by said tariff to calculate a parking payment, means for transmitting to said card information defining said parking authority and said parking payment, said card comprising means for storing said information for future use, and further comprising detachable timing means synchronized with the means for measuring the elapsed parking time and provided with alarm means to alert the driver of an approaching expiration of the parking time.

3. A portable parking meter device, comprising, in combination, a portable registering device and an exchangeable card to be used in connection therewith, said card comprising means for storing and transmitting to said registering device data defining a parking time purchased with said card and not yet used, said registering device comprising means for selecting and registering therein, at each parking, signals identifying a parking authority which is to be credited with a parking fee and a tariff associated with a parking lot, means for measuring an elapsed parking time, means for multiplying said elapsed parking time by said tariff to calculate a parking payment, means for transmitting to said card information defining said parking authority and said parking payment, said card comprising means for storing said information for future use, and further provided with means for actuating the portable parking meter device by remote control.

* * * * *